(12) United States Patent
Goldman (10) Patent No.: US 6,646,420 B1
(45) Date of Patent: Nov. 11, 2003

(54) METHOD OF INTERRUPTING AND DYNAMICALLY SWITCHING RANGES TO IMPROVE BATTERY CHARGE MEASUREMENT RANGE IN A SIGMA DELTA CONVERTER

(75) Inventor: Stanley J. Goldman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 10/161,349

(22) Filed: May 31, 2002

(51) Int. Cl.$^7$ ............................................. H01M 10/44
(52) U.S. Cl. ....................... 320/132; 324/433
(58) Field of Search ................................ 320/127, 128, 320/135, 137, 139, 141, 132, 149; 324/426, 427, 432, 433

(56) References Cited

U.S. PATENT DOCUMENTS 5,633,573 A * 5/1997 van Phuoc et al.
5,955,869 A * 9/1999 Rathmann
6,025,695 A * 2/2000 Friel et al.

* cited by examiner

Primary Examiner—Edward H. Tso
(74) Attorney, Agent, or Firm—Ronald O. Neerings; Wade James Brady, III; Frederick J. Telecky, Jr.

(57) ABSTRACT

A method of improving the battery charge measurement range in a sigma delta converter associated with portable applications such as a cell phone is implemented by interruption of the sigma delta modulator measurement process and changing its reference voltage and measurement time to allow an integrated current to occur over a wider dynamic range.

14 Claims, 10 Drawing Sheets

METHOD OF INTERRUPTING AND DYNAMICALLY SWITCHING RANGES TO IMPROVE BATTERY CHARGE MEASUREMENT RANGE IN A SIGMA DELTA CONVERTER

BACKGROUND OF THE INVENTION

1. Field of the Invention

This invention relates generally to battery charge measurement techniques, and more particularly, to a method of interrupting and dynamically switching ranges to improve battery charge measurement range in a sigma delta converter.

2. Description of the Prior Art

Consumers are continually frustrated with not knowing the exact amount of battery life remaining in their portable applications. An accurate charge reading tells the user precisely how much operating or standby time remains before the battery runs down, or how much time it will take for the battery to reach full charge. Further, the system can use charge information as an input to power management routines to more efficiently manage battery power versus user demand of system resources and peripherals.

In view of the foregoing, it would be desirable and advantageous to provide a technique of extending system operating time associated with portable applications beyond that available using presently known techniques for managing battery charge.

SUMMARY OF THE INVENTION

The present invention is directed to a method of improving the battery charge measurement range in a sigma delta converter associated with portable applications such as a cell phone.

In one aspect of the invention, a method of improving the battery charge measurement range in a sigma delta converter associated with portable applications is implemented by interrupting the sigma delta modulator and changing a reference voltage and measurement time to allow integrated current to occur over a wider dynamic range.

In another aspect of the invention, a method of improving the battery charge measurement range in a sigma delta converter associated with portable applications is implemented by using the transmit enable signal to be used to change the range of the sigma delta modulator dynamically to capture a large current pulse without causing error.

In yet another aspect of the invention, a method of improving the battery charge measurement range in a sigma delta converter associated with portable applications is implemented to maintain accurate integration of the current by adding the partial results of an interrupted measurement to the charge accumulator.

In still another aspect of the invention, a method of improving the battery charge measurement range in a sigma delta converter associated with portable applications is implemented to maintain accurate integration of the current when the transmit pulse exceeds the maximum sigma delta range by adding the partial results of an interrupted measurement to the charge accumulator, and then switching the dynamic range back to a standby range.

DESCRIPTION OF THE DRAWINGS

Other aspects, features and advantages of the present invention will be readily appreciated, as the invention becomes better understood by reference to the following detailed description, when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, consumers are continually frustrated with not knowing the exact amount of battery time remaining in their portable applications. An accurate charge reading tells the user precisely how much operating or standby time remains before the battery runs down, or how much time it will take for the battery to reach full charge. Further, the system can use charge information as an input to power management routines to more efficiently manage battery power versus user demand of system resources and peripherals. The present invention described by way of the detailed description of the preferred embodiments herein below is directed to a technique of extending system operating time associated with portable applications beyond that available using presently known techniques for managing battery charge.

Figure 1:
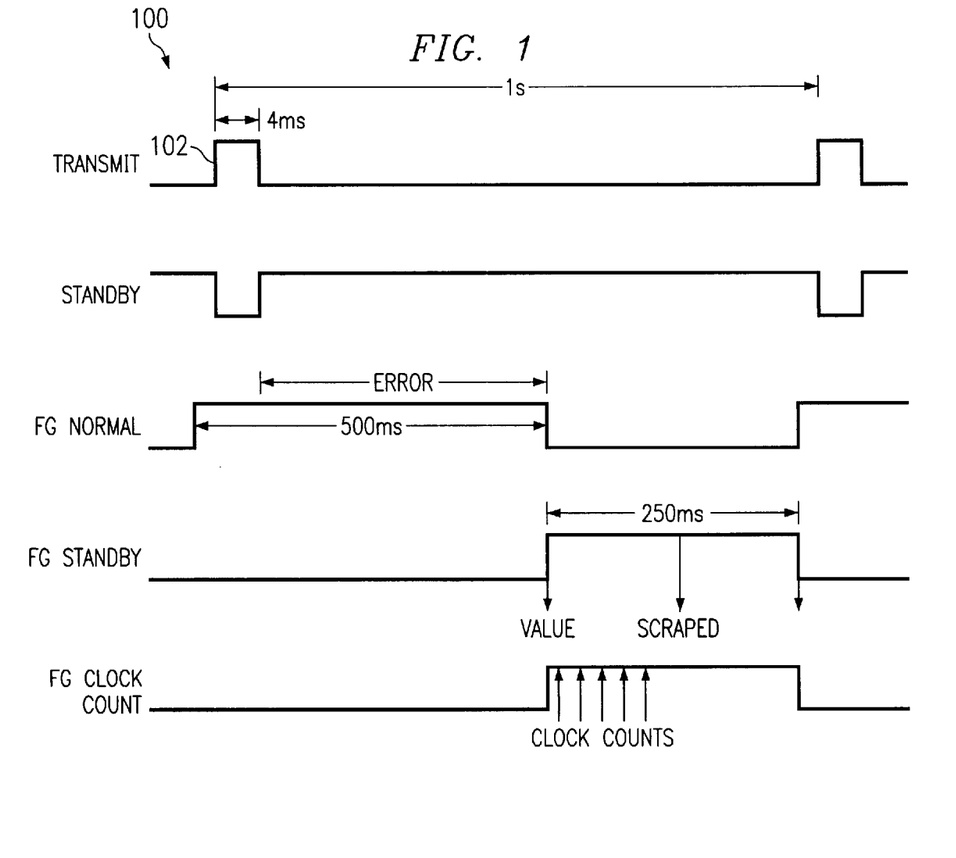
FIG. 1 is a waveform timing diagram illustrating wireless cell phone timing during a standby mode using a high pulsed transmit current.

A repetitive high current pulse during low current sleep mode associated with portable applications presents a technical challenge for accurate measurement because of the small time duration and wide dynamic range. This mode occurs, for example, when using a cell phone because the cell phone must be poled periodically by the local network to maintain a connection while the user is not talking. FIG. 1 shows the timing diagram 100 of one such pulsed mode condition. Since this mode can occur from minutes to hours, accurate charge measurement becomes important. With continued reference to FIG. 1, the transmit current profile 102 may have a base of 1 mA and a peak of 100–500 mA. The pulse time span is generally in the range of 4–60 ms; and the repetition rate can vary from 0.5 to 2 seconds.

Modern solutions use sigma delta modulators to measure the discharge of the battery. Power consumption is minimized by using a low clock frequency such as 32 kHz. A 13-bit conversion then takes $(2^{13}/32\ \text{kHz})=0.25$ s to process and covers a 50 $\mu$A pulse with 5% (LSB=0.05/2*50 $\mu$A) accuracy to 200 mA (Vref=10 mV/0.05 ohms sense resistor). The measured current is sent to a measurement accumulator to continuously monitor the charge being withdrawn from the battery.

The 0.25 s measurement time of the foregoing example solution is much greater than the high transmit pulse width (4 ms). Sampling theory then teaches that a 13-bit conversion should not work to accurately measure the pulse. The present inventor found that the pulsed current could be accurately measured however, by studying the characteristics of the sigma delta modulator used to measure the discharge of the battery.

Figure 2:
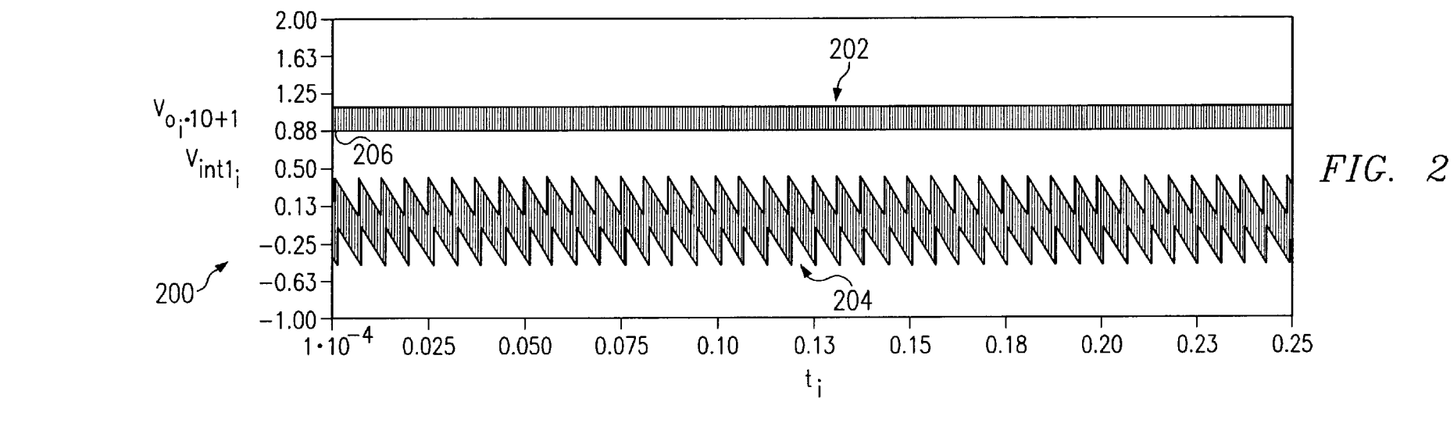
FIG. 2 is a waveform diagram illustrating pulsed waveform and sigma delta modulator waveforms.

FIG. 2 illustrates time domain input and output waveforms 200 in which the upper waveform 202 is a pulsed waveform and the lower waveform 204 is a sigma delta modulator waveform. Specifically, FIG. 2 shows a response to a 1/100 duty cycle in the sleep mode in which the upper waveform 204 depicts the comparator toggling. The Y-axis is scaled and offset to better present the waveforms 202, 204; and the lower waveform 204 depicts the integrator (sigma delta modulator) output. The pulsed signal 206 is at the beginning of the waveform 202.

Figure 3:
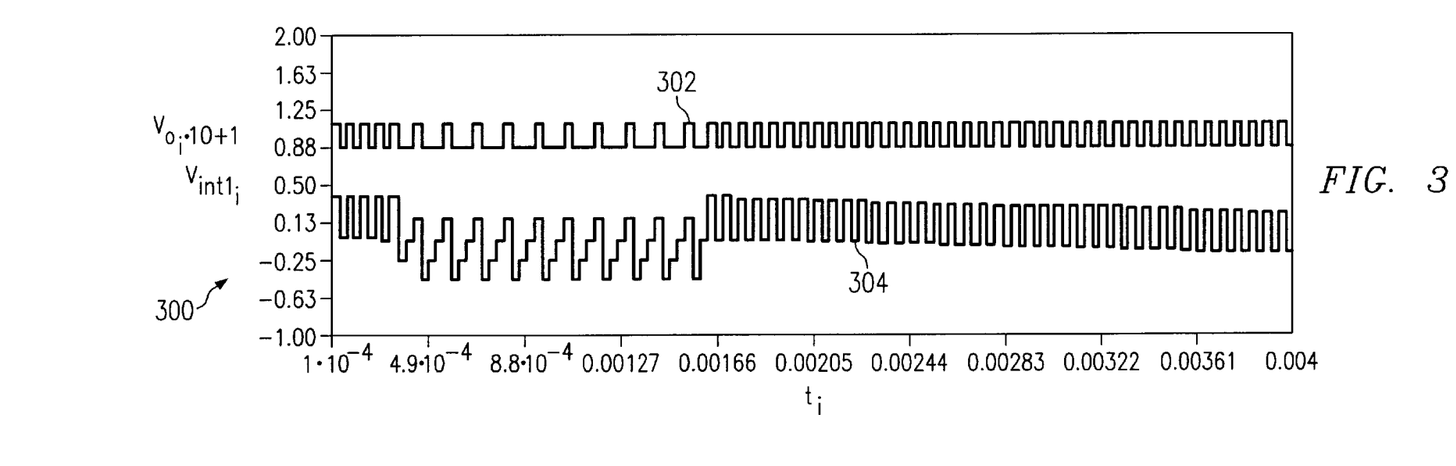
FIG. 3 is a zoomed-in view of the pulsed waveform depicted in FIG. 2.

FIG. 3 is a zoomed-in view 300 of the time domain input and output waveforms 200 shown in FIG. 2. Specifically, FIG. 3 illustrates a zoomed-in view of the transition from 1 mA to 100 mA in which the top waveform 302 again depicts the comparator toggling. The Y-axis is scaled and offset for better presentation. The bottom waveform 304 again illustrates the integrator (sigma delta modulator) output. It can easily be seen that when the comparator rate changes, the integrator slope changes, which shows that the sigma delta modulator does in fact integrate the input signal. The present inventor has applied simulations to demonstrate the integration of this pulse is in fact accurate to within 1 LSB. Importantly however, if the high current pulse (i.e. 500 mA) is greater than the maximum sigma delta range value (i.e. 200 mA), a large error will occur. The present inventor has also found that interrupting the sigma delta modulator measurement, and changing the reference voltage and measurement time allows integrated current to occur over a wider dynamic range. The transmit enable signal, for example, can be used to change the range of the sigma delta modulator dynamically to capture the large current pulse without causing error. The partial results of the interrupted measurement are added to the charge accumulator to maintain the accurate integration of the current. When the transmit pulse exceeds the maximum sigma delta range, the partial results of the interrupted measurement are again added to the charge accumulator and the dynamic range is switched back to the standby mode range.

A more detailed explanation of the foregoing embodiments is now set forth below with reference to FIGS. 4–12. The present inventor found that the integrator pattern before and after the pulse remained the same. It can be easily appreciated therefore, that if the pattern also remains the same for the interrupt case, then equivalency will exist between the pulsed case and the interrupt case.

Figure 4:
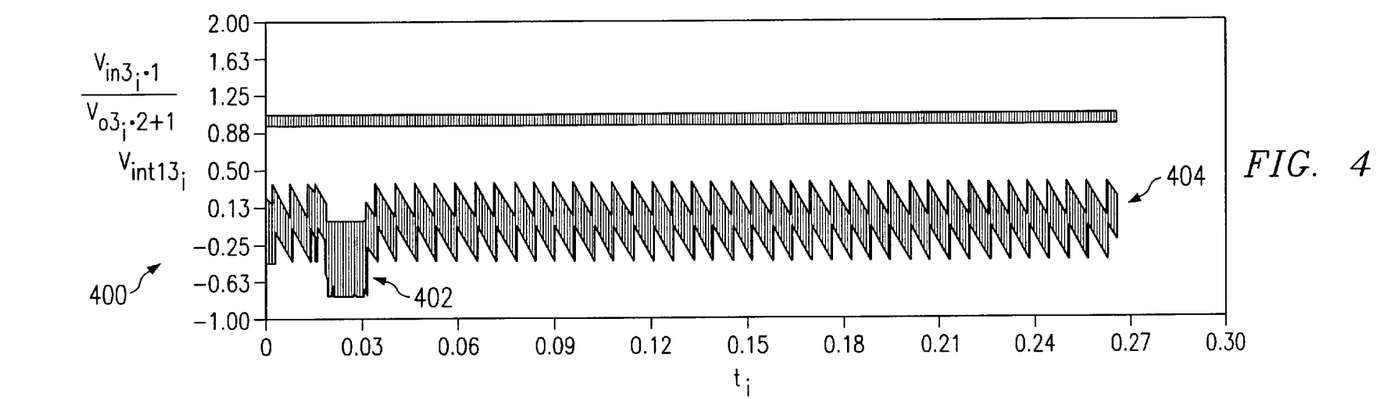
FIG. 4 is an integrator waveform diagram illustrating time domain input and output waveforms associated with $1/16^{th}$ of a standby mode followed by a full standby mode.

Moving now to FIG. 4, time domain input and output waveforms 400 illustrate a standby mode interrupted with 1/16$^{th}$ of the full cycle (0.016 s) 402, followed by a full standby mode (0.25 s) 404 with a current pulse (180 mA/0.012 pulse width) on a 50 $\mu$V (1 mA) DC level. FIG. 4 demonstrates the integrator pattern continues to repeat both before and after the interrupt 402, confirming the equivalency between the interrupt case and the non-interrupt case discussed herein before.

Figure 5:
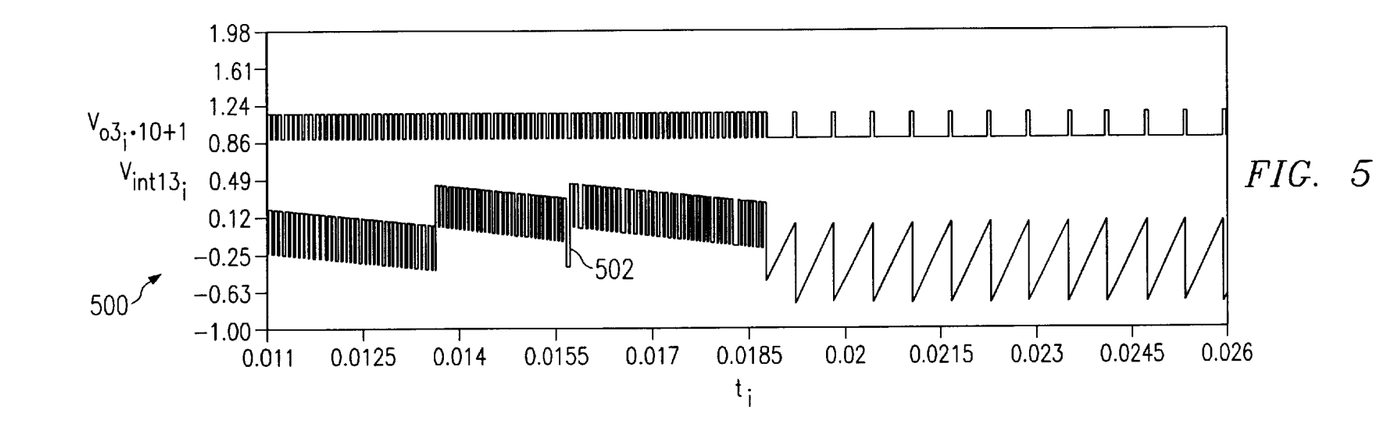
FIG. 5 is a zoomed-in view of the transition from low current to high current for the waveform depicted in FIG. 4.

FIG. 5 illustrates time domain input and output waveforms 500 showing a more highly detailed, zoomed-in view of an interrupt 502 at 0.016 s followed by a current pulse at 0.0185 s. The change in integration slope when the large current pulse starts is easily seen.

Figure 6:
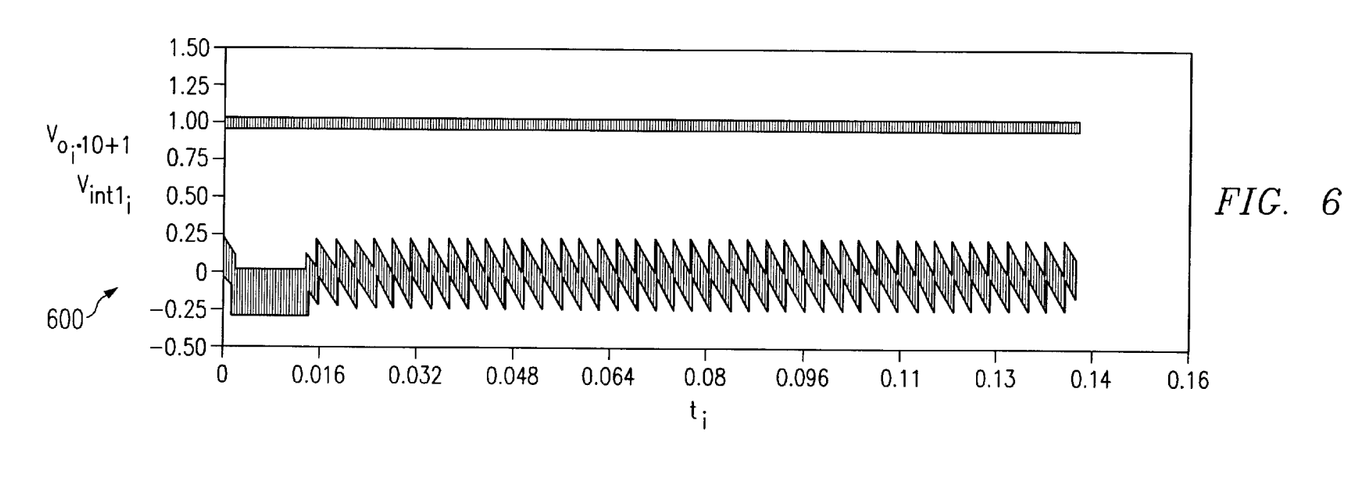
FIG. 6 is an integrator waveform diagram illustrating time domain input and output waveforms and showing a standby mode with $1/8^{th}$ period added, and its response to a 1–50 mA current pulse in which 10% of the current pulse is at 50 mA and the rest is at 1 mA.

FIG. 6 depicts time domain input and output waveforms 600 illustrating 1/8$^{th}$ period added to a sleep mode, and the response to a 10% current pulse (50 mA level and 1 mA rest level) without an interruption. The total accumulated count for this uninterrupted case was found to equal −220.

Figure 7:
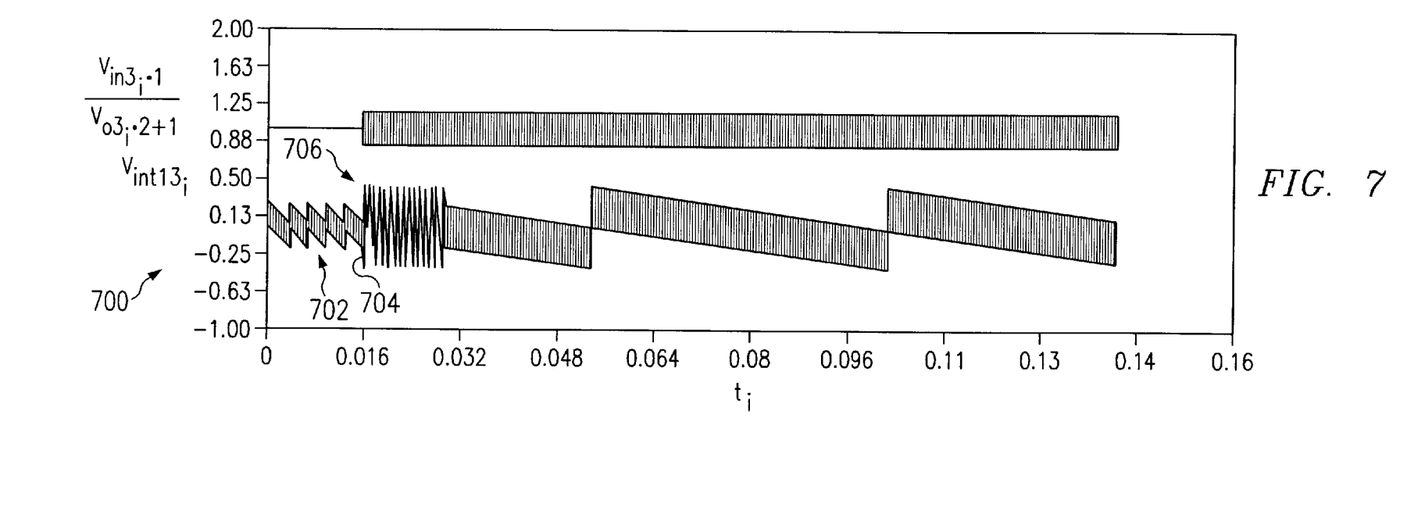
FIG. 7 in an integrator waveform diagram illustrating time domain input and output waveforms in which a standby mode is interrupted at 0.016 s, followed by a full normal mode measurement with a current pulse (sigma delta response to an interrupt and switched modes with a current pulse)

FIG. 7 depicts time domain input and output waveforms 700 illustrating a standby mode 702 interrupted with a pulse 704 at 0.016 s, followed by a full normal mode measurement with a current pulse 706. More specifically, FIG. 7 shows the sigma delta modulator response to an interrupt pulse 704 and switched modes with a current pulse 706. The 1 mA current integration slope after the current pulse 706 can be seen to be different than the 1 mA current integration slope in the standby mode 702, demonstrating the change in dynamic range. During the interrupted standby mode 702, the accumulator counted to −4; and during the normal mode, the accumulator counted to −14. The total count was determined as:

Accumulated value=−4 (standby interrupted)+[16×−14](weight× normal mode)=−228

A comparison of the −228 accumulated value obtained in the interrupted mode and the −220 accumulated value obtained in the uninterrupted mode demonstrates the existence of an error equivalent to ½ LSB, or no more than a 3.5% error.

Figure 8:
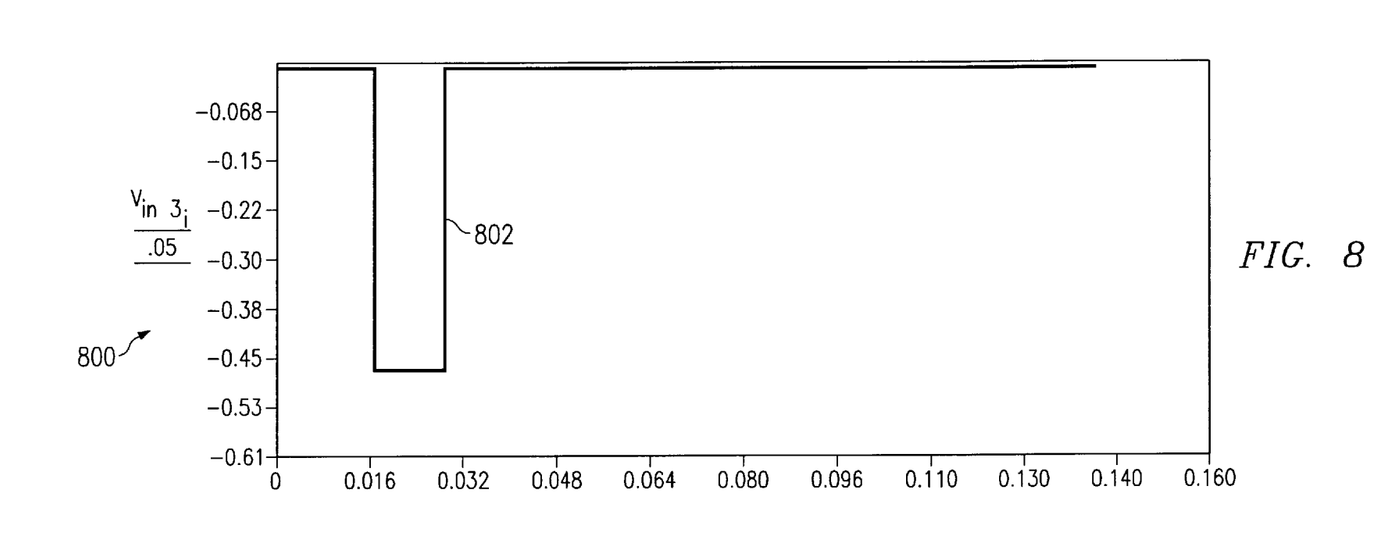
FIG. 8 illustrates time domain input waveforms in which a current pulse is greater than the standby mode range for a current pulse from 1–480 mA with a 20% duty cycle pulse width.

FIG. 8 illustrates time domain input waveforms 800 depicting a case where the current pulse 802 is greater than the standby mode range. Specifically, FIG. 8 shows the waveform of the current pulse 802 from 1–480 mA with a 20% duty cycle pulse width.

Figure 9:
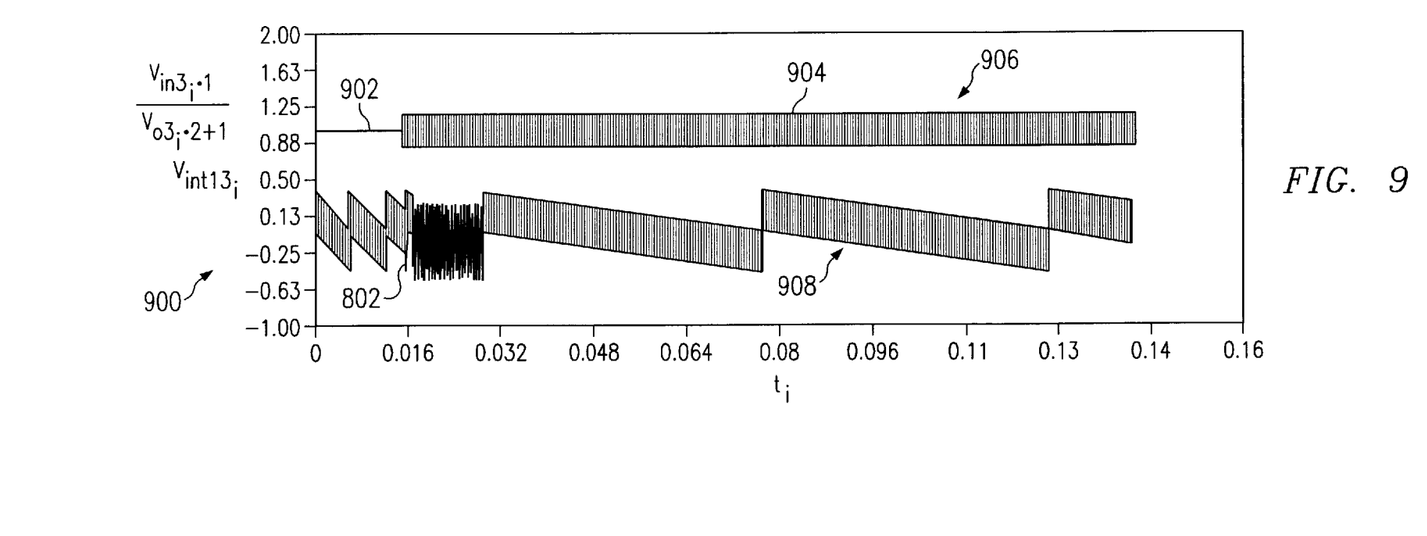
FIG. 9 illustrates time domain input and output waveforms depicting a standby mode interrupted to normal mode with a 480 mA current pulse.

FIG. 9 illustrates time domain input and output waveforms 900 showing a standby mode 902 interrupted to normal operating mode 904 with the 480 mA current pulse 802 having a 20% duty cycle pulse width shown in FIG. 8. The reference levels change (as shown by the amplitude increase in the upper trace 906; and the slope of the average integration slope shown in the lower trace 908 can be seen to change from sleep mode 902 to normal operating mode 904. Further, the sigma delta modulator output level increases with the reference level change. The gain of the modulator therefore must be reduced to compensate and maintain the same peak-to-peak voltage swing at the output of the modulator.

Figure 10:
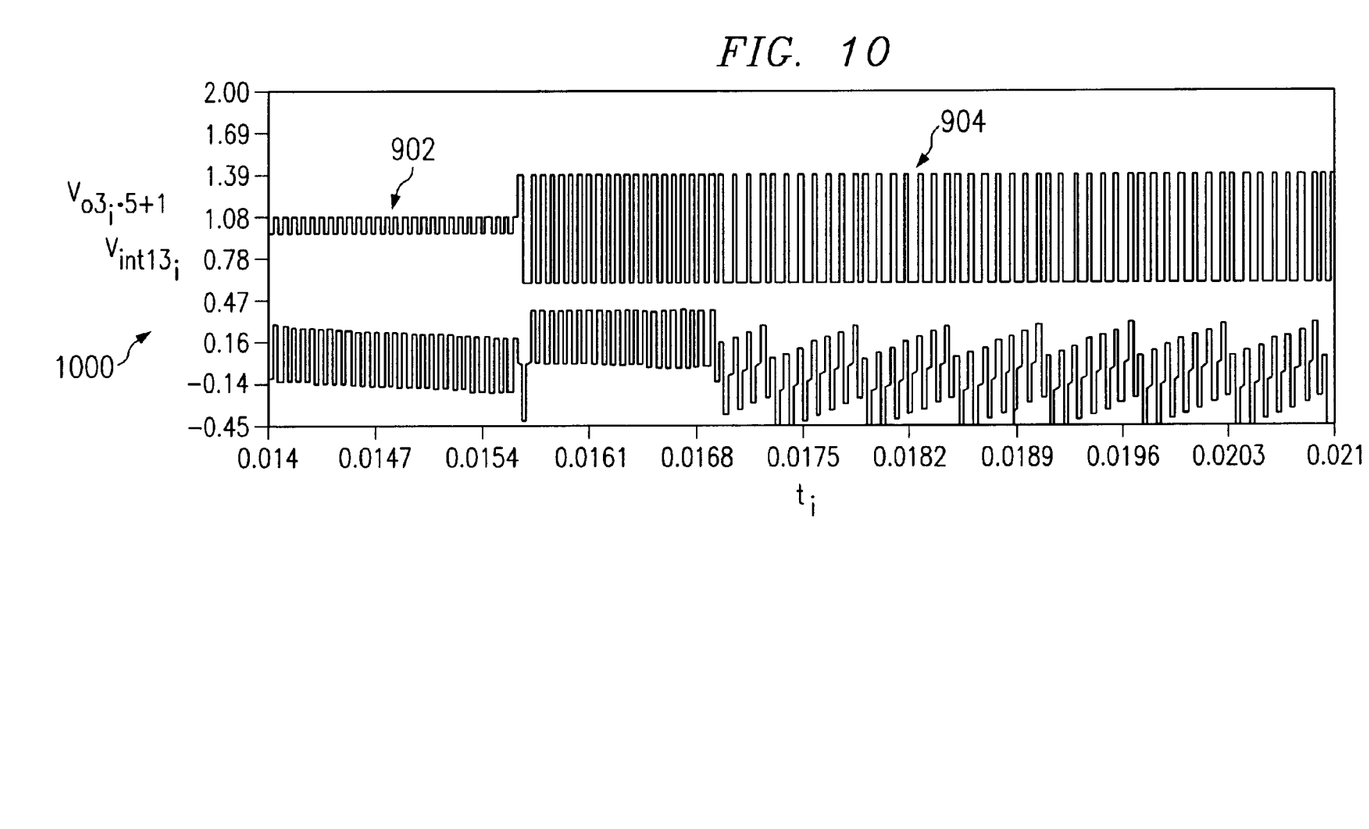
FIG. 10 illustrates time domain input and output waveforms depicting a zoomed-in view of the transition from interrupted standby mode to normal mode with 480 mA pulsed current.

FIG. 10 illustrates time domain input and output waveforms 1000 showing a zoomed-in view of the transition from the interrupted sleep mode 902 to the normal operating mode 904 depicted in FIG. 9 using the 480 mA pulsed current 802 depicted in FIG. 8. The accumulator was found to count to –4 during the interrupted standby mode 902 and was found to count to –122 during the normal operating mode 904. The total count was computed as:

Accumulated value=–4 (sleep interrupted)+16×[–122](weight× normal mode)=–1956

Comparing –1956×2.4 $\mu$V LSB/0.05 Ohms=95.45 mA in the interrupted mode with the 20% duty cycle of 480 mA=96 mA in the continuous operating mode yields an error of only 0.6%. The present inventor found a simulation of the saturated sigma delta modulator with the same current profile provided an accumulated value of –970 LSBs, which produces –970×2.4 $\mu$V/0.05=46.5 mA to yield an error of 106%.

Figure 11:
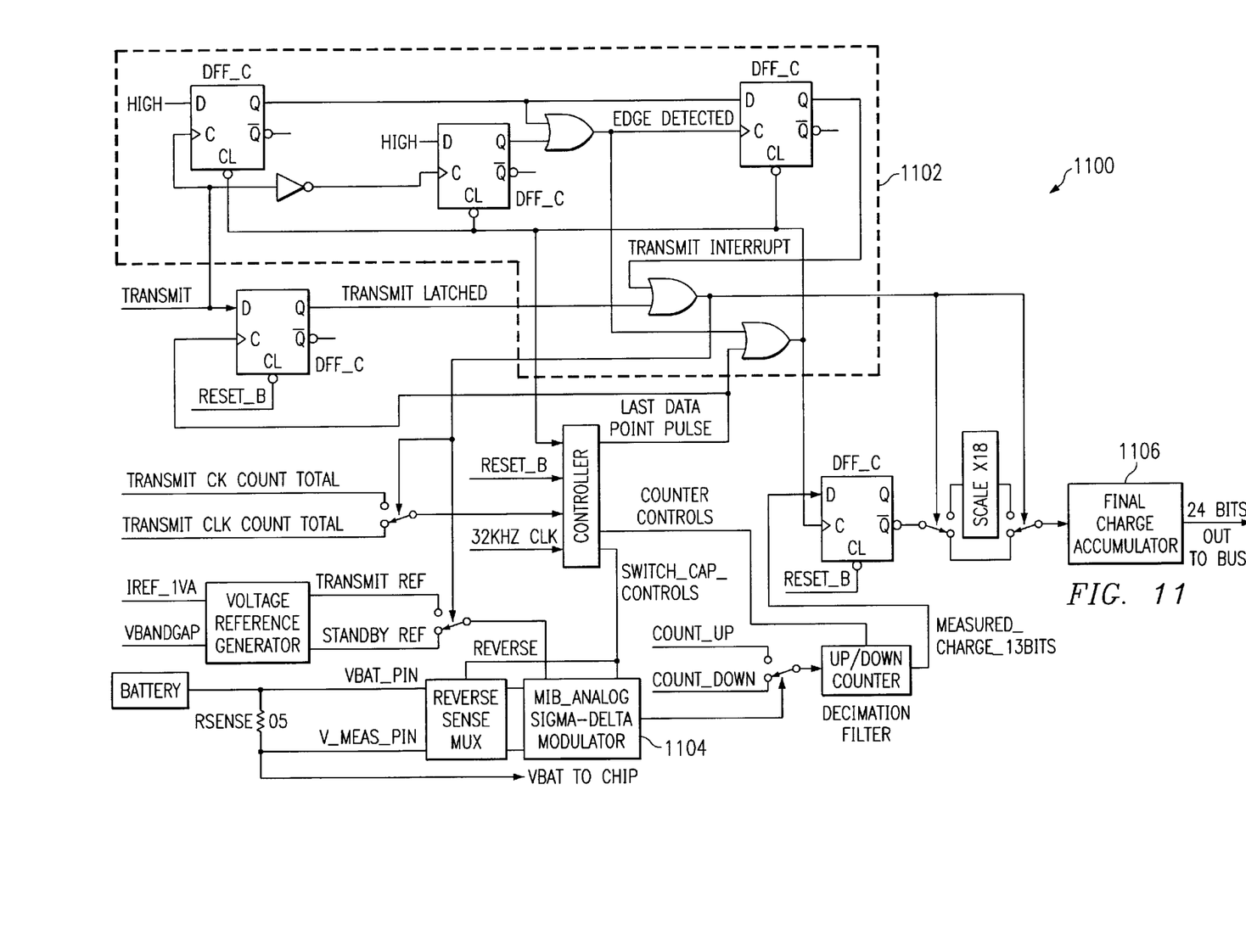
FIG. 11 is a functional block diagram illustrating a system for implementing a method of interrupting and dynamically switching ranges to improve battery charge measurement range in a sigma delta converter according to one embodiment of the present invention.

FIG. 11 is a functional block diagram illustrating a system 1100 for implementing a method of interrupting and dynamically switching ranges to improve battery charge measurement range in a sigma delta converter 1104 according to one embodiment of the present invention. The system 1100 can be seen to include a plurality of logic and switching elements 1102. These logic and switching elements 1102 are configured to, among other things, monitor the battery operated device operating mode such that if the operating mode switches from normal to standby or from standby to normal, a partial count value is sent to the accumulator 1106 immediately prior to changing operating modes in order to reflect a more accurate battery charge value as described herein before.

Figure 12:
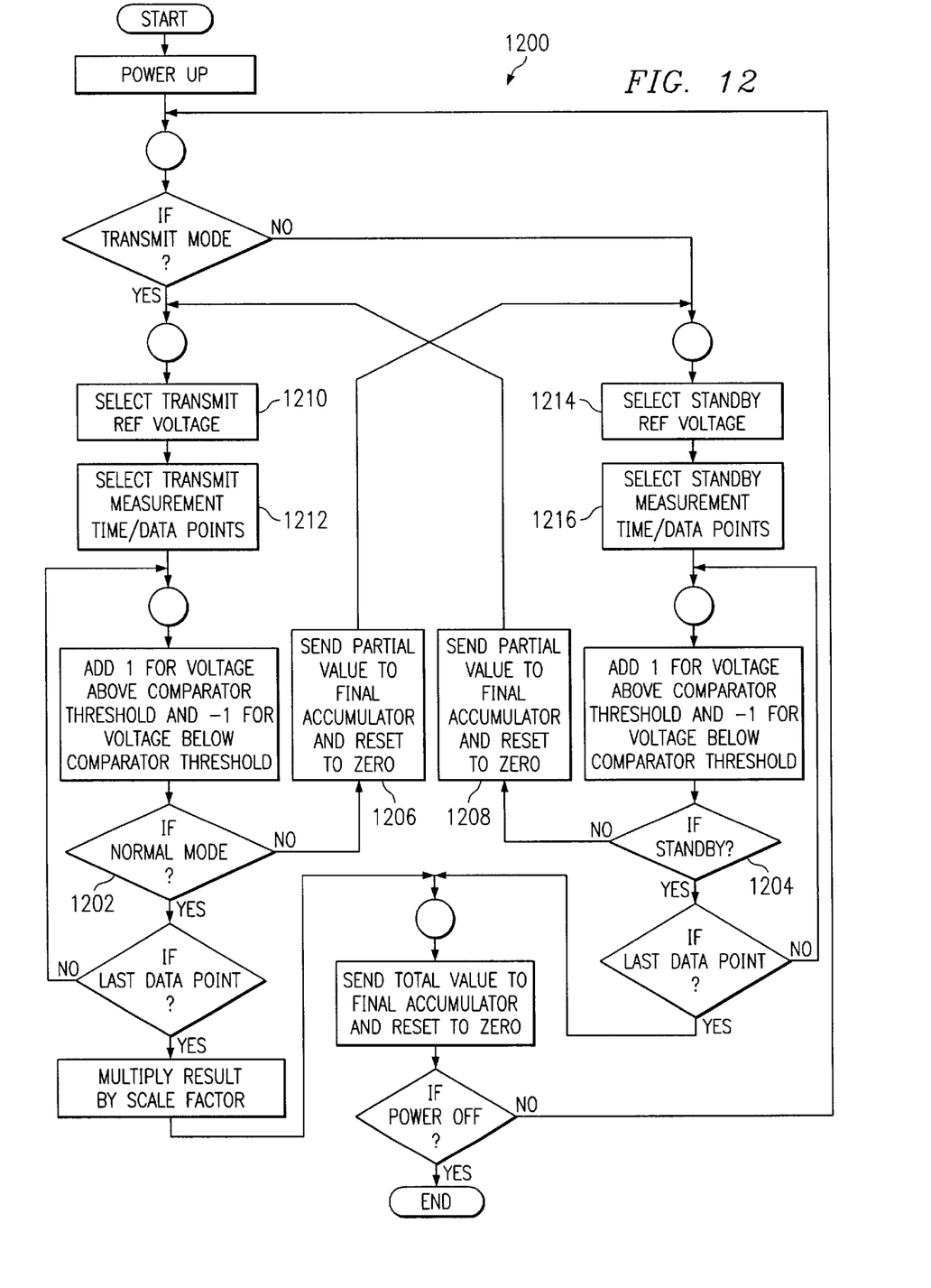
FIG. 12 is a flow chart depicting an algorithm directed to a method of interrupting and dynamically switching ranges to improve battery charge measurement range in a sigma delta converter according to one embodiment of the present invention.

FIG. 12 is a flow chart depicting an algorithm 1200 directed to a method of interrupting and dynamically switching ranges to improve battery charge measurement range in a sigma delta converter according to one embodiment of the present invention. This technique can be seen in blocks 1202 and 1204 to monitor the operating mode of the battery powered device; and if the operating mode changes from normal to standby or from standby to normal, then updates the final charge accumulator value by adding the partial count values provided by the sigma-delta modulator 1104 to the final charge accumulator 1106, as seen in blocks 1206 and 1208. When the operating mode changes, the reference voltage values and measurement time/data points are immediately changed as seen in blocks 1210, 1212, 1214 and 1216, to reflect the values necessary to prevent saturation of the sigma-delta modulator 1104 while simultaneously optimizing the dynamic range of the sigma-delta modulator 1104.

Figure 13:
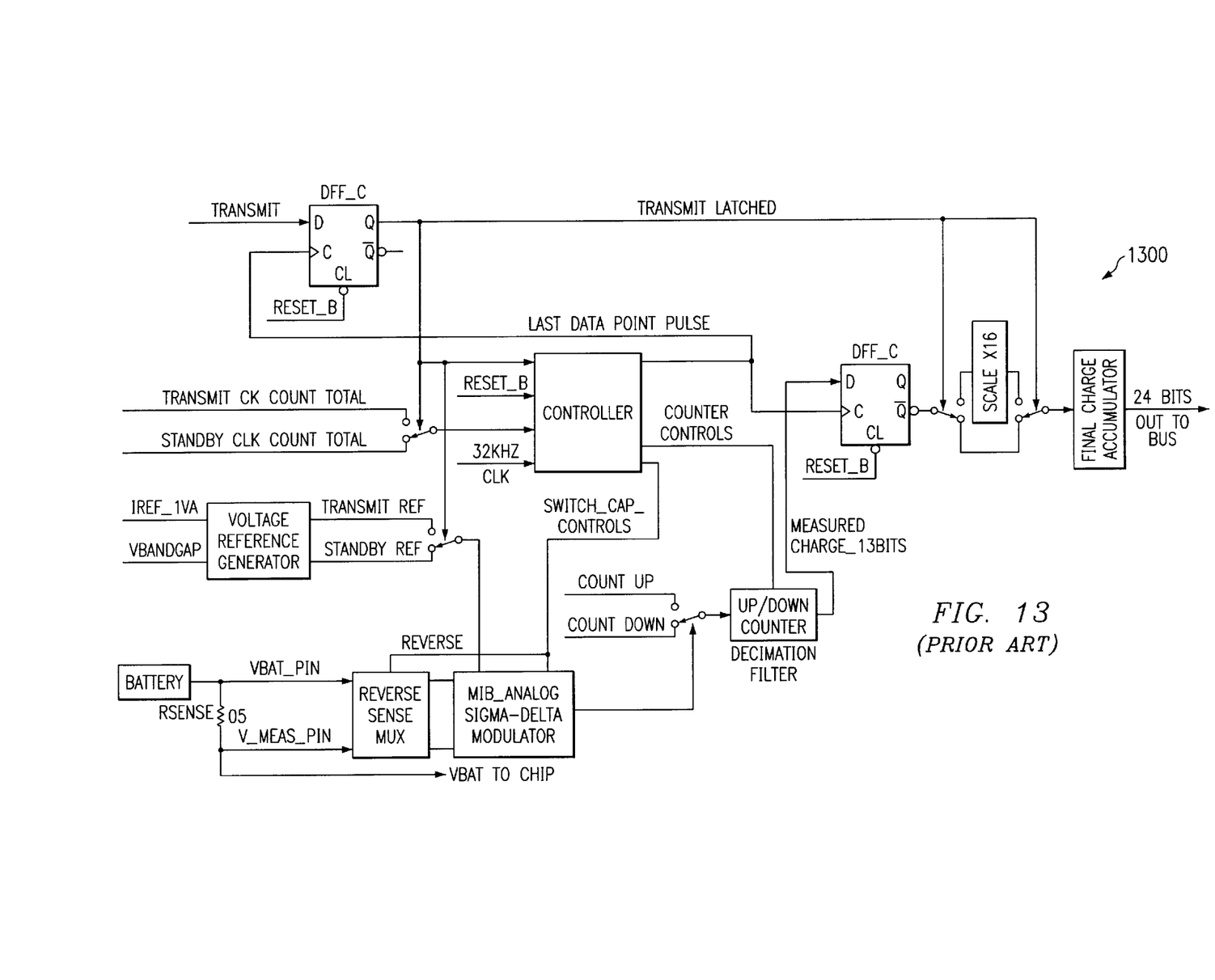
FIG. 13 is a functional block diagram illustrating a system for implementing a method of dynamically switching ranges to measure battery charge in a fashion that is known in the art, and that does not employ an interrupt to improve battery charge measurement range in a sigma delta converter.

FIG. 13 is a functional block diagram illustrating a system 1300 for implementing a method of dynamically switching ranges to measure battery charge in a fashion that is known in the art, and that does not employ an interrupt to improve battery charge measurement range in a sigma delta converter.

Figure 14:
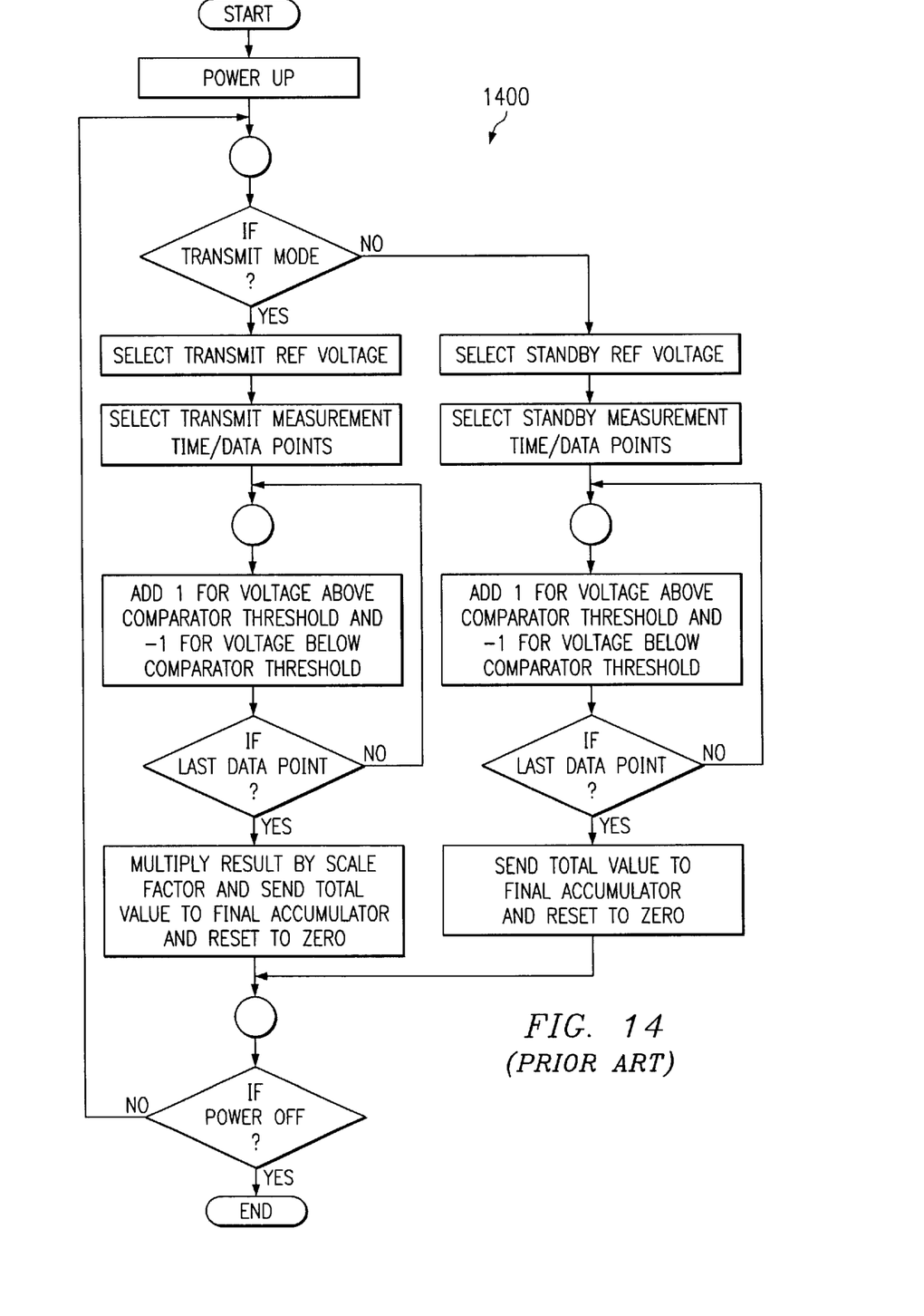
FIG. 14 is a flow chart depicting an algorithm known in the art for measuring battery charge in a fashion that does not employ an interrupt for dynamically switching sigma delta converter measurement ranges.

FIG. 14 is a flow chart depicting an algorithm 1400 known in the art for measuring battery charge in a fashion that does not employ an interrupt for dynamically switching sigma delta converter measurement ranges.

In summary explanation, a method of improving the battery charge measurement range in a sigma delta converter associated with portable applications such as a cell phone is achieved by interruption of the sigma delta converter measurement and changing its reference voltage and measurement time to allow an integrated current to occur over a wider dynamic range.

In view of the above, it can be seen the present invention presents a significant advancement in the art of battery charge measurements associated with portable applications. In view of the foregoing descriptions, it should be apparent that the present invention also represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of increasing battery charge measurement range in a sigma delta converter associated with a portable application, the method comprising the steps of:
   providing a battery powered communication device having a sigma delta converter operational to measure remaining battery charge and wherein the device is configured to enter a low current standby mode when it is not in its normal communication mode;
   transmitting a stream of high current poling pulses via the communication device while the communication device is in its low current standby mode;
   monitoring the remaining battery charge via the sigma delta converter; and
   dynamically interrupting the sigma delta converter monitoring function prior to each high current poling pulse to effectuate a change in the sigma delta converter gain such that a desired peak-to-peak voltage swing is maintained at the output of the sigma delta converter.

2. The method according to claim 1 wherein the step of dynamically interrupting the sigma delta converter monitoring function comprises interrupting the sigma delta converter monitoring function via a communication device transmit enable signal.

3. The method according to claim 1 wherein the step of monitoring the remaining battery charge via the sigma delta converter comprises measuring a battery discharge rate and generating a measurement signal thereof.

4. The method according to claim 3 wherein the step of monitoring the remaining battery charge via the sigma delta converter further comprises communicating the measurement signal to a measurement accumulator to continuously monitor the charge withdrawn from the battery.

5. The method according to claim 1 wherein the step of dynamically interrupting the sigma delta converter monitoring function prior to each high current poling pulse to effectuate a change in the sigma delta converter gain comprises changing the sigma delta converter reference voltage to achieve an increase in the dynamic range of the sigma delta converter.

6. A method of increasing battery charge measurement range in a sigma delta modulator associated with a portable application, the method comprising the steps of:

providing a battery powered device having a sigma delta modulator configured to measure a battery discharge wherein the battery powered device is configured to enter a low current standby mode when it is not in its normal operating mode;

transmitting at least one high current poling pulse via the battery powered device while the battery powered device is in its low current standby mode;

measuring the battery discharge rate via the sigma delta modulator;

dynamically interrupting the sigma delta modulator measuring function prior to each high current poling pulse; and adjusting the sigma delta modulator gain subsequent to each dynamic interruption of the sigma delta modulator such that a desired peak-to-peak voltage swing is maintained at the output of the sigma delta modulator, wherein each gain adjustment is determined by the characteristics associated with the next high current poling pulse.

7. The method according to claim 6 wherein the step of dynamically interrupting the sigma delta modulator measuring function comprises interrupting the sigma delta modulator measuring function via a battery powered device transmit enable signal.

8. The method according to claim 6 further comprising the step of generating a measurement signal in response to measuring the battery discharge rate via the sigma delta modulator.

9. The method according to claim 8 further comprising the step of communicating the measurement signal to a measurement accumulator to continuously monitor the charge withdrawn from the battery.

10. The method according to claim 6 wherein the step of adjusting the sigma delta modulator gain subsequent to each dynamic interruption of the sigma delta modulator such that a desired peak-to-peak voltage swing is maintained at the output of the sigma delta modulator comprises changing the sigma delta modulator reference voltage to achieve an increase in the dynamic range of the sigma delta converter.

11. A method of increasing battery charge measurement range in a sigma delta modulator associated with a portable application, the method comprising the steps of:

(a) providing a battery powered device having a sigma delta modulator configured to measure a battery discharge, and further having a final charge accumulator configured to store a battery charge value, wherein the battery powered device is configured to enter a low current standby mode when it is not in its normal operating mode;

(b) monitoring an operating state of the battery powered device to determine whether the device is in a transmit mode or the standby mode;

(c) selecting a first reference voltage when the device is in the transmit mode and a second reference voltage when the device is in the standby mode;

(d) measuring the battery discharge rate via the sigma delta modulator using the first reference voltage when the device is in the transmit mode and using the second reference voltage when the device is in the transmit mode;

(e) communicating a first partial value to the final charge accumulator when the device transitions from the standby mode to the transmit mode and communicating a second partial value to the final charge accumulator when the device transitions from the transmit mode to the standby mode; and (f) repeating steps (b)–(e) until the device is powered off to realize a final accumulator value that represents the charge remaining in the battery.

12. The method according to claim 11 wherein the step (b) of monitoring an operating state of the battery powered device to determine whether the device is in a transmit mode or a standby mode comprises dynamically interrupting the sigma delta modulator measuring function via a device transmit enable signal when the device enters the transmit mode.

13. A battery powered device comprising:

a sigma delta modulator configured to measure a battery discharge;

a final charge accumulator configured to store a battery charge value; and a system of logic and switching devices configured to monitor an operating state of the battery powered device to determine whether the device is in a transmit mode or the standby mode and select a first reference voltage when the device is in the transmit mode and a second reference voltage when the device is in the standby mode such that the sigma delta modulator measures the battery discharge rate using the first reference voltage when the device is in the transmit mode and measures the battery discharge rate using the second reference voltage when the device is in the transmit mode, wherein a first partial count value is communicated to the final charge accumulator from the sigma delta modulator when the device transitions from the standby mode to the transmit mode and a second partial count value is communicated to the final charge accumulator from the sigma delta modulator when the device transitions from the transmit mode to the standby mode to realize a final charge accumulator value that represents the charge remaining in the battery.

14. The battery powered device according to claim 13 wherein the first and second partial count values comprise counts completed by the sigma delta modulator while the battery powered device is transitioning between its transmit mode and its standby mode.

* * * * *